Figure 1:
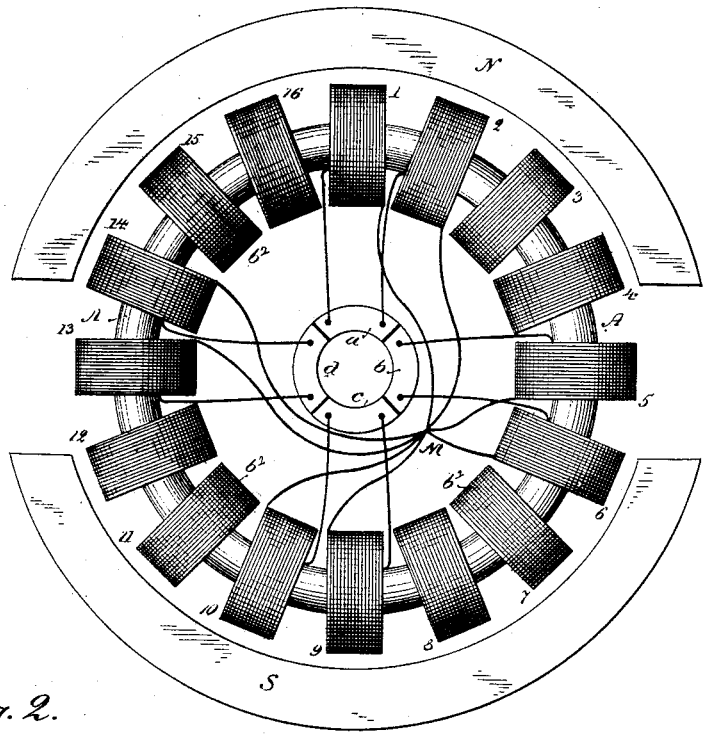

(No Model.)

B. F. ORTON.
ARMATURE FOR DYNAMO ELECTRIC MACHINES.

No. 309,560. Patented Dec. 23, 1884.

Witnesses:
Ernest Abshagen
Thos. Toomey

Inventor:
B. F. Orton
By his Attorney H. C. Townsend

UNITED STATES PATENT OFFICE.

BENJAMIN F. ORTON, OF EAST SAGINAW, MICHIGAN.

ARMATURE FOR DYNAMO-ELECTRIC MACHINES.

SPECIFICATION forming part of Letters Patent No. 309,560, dated December 23, 1884.

Application filed December 11, 1883. (No model.)

*To all whom it may concern:*

Be it known that I, BENJAMIN F. ORTON, a citizen of the United States, and a resident of East Saginaw, in the county of Saginaw and State of Michigan, have invented certain new and useful Improvements in Armatures for Dynamo-Electric Machines, of which the following is a specification.

The object of my invention is to improve the efficiency and the durability of dynamo-electric machines; and to this end my invention consists in a novel manner of connecting the coils upon the armature of the machine, the distinguishing characteristics of which will be hereinafter described, and then pointed out in the claims.

My invention is intended, primarily, for application to armatures of the type known as "ring armatures," or those in which the coils are wound in and out around the circumferential axis of a ring or cylinder, although it is also capable of application to so-called "cylinder" or "drum" armatures, or those in which the coils are wound entirely upon the exterior of the cylindrical carrier.

In connecting the coils or bobbins of an armature to one another and to a commutator according to my invention, I take two or more bobbins or coils upon the same side of the armature or in the same general armature plane, and I connect their same ends (or those that are of the same polarity in any given arc of revolution) separately—that is, in multiple arc—to the same commutator-plate or to the same portion of the commutator, so that such ends shall simultaneously be connected to the positive or negative commutator-brush, as the case may be, and the current shall flow from said bobbins in multiple arc. The opposite ends of said coils or bobbins I connect in a common joint with similar ends of diametrically-opposite bobbins, or bobbins in the same armature plane with, but of opposite polarity to, the first-named set of two or more bobbins or coils, while the remaining free ends of said diametrically-opposite bobbins are connected separately or in multiple arc in a similar manner to the opposite side of the commutator. I use the term "diametrically opposite" to express the relation of the coils on a ring-armature revolving between two field-of-force pole-pieces, in which case the diametrically-opposite coils have their inner or their outer ends, as the case may be, of the opposite polarity.

In carrying out my invention with other machines diametrically-opposite bobbins or coils are to be taken as those which are symmetrically disposed with relation to the magnetic field, and which in any given position of the armature have their similar ends first or last of the opposite polarity. With a set of bobbins or coils, four or more, connected as above described, I propose, also, to combine a second set disposed in a general armature plane at an angle—preferably a right angle—to that of the first set, all the bobbins thus combined having their same ends, or those which in passing through the same field are of the same polarity, connected together in a common joint, while their remaining ends are connected as follows: Those two or more ends of the four or more coils in the same general armature plane that are at the same time of one polarity are connected in multiple arc to the same portion of the commutator; those ends that are of the opposite polarity to the opposite side of the commutator. The free ends of the coils in the other armature plane are similarly connected to opposite sides of the commutator, but in a commutator plane removed from the part to which the first coils are connected by an angle equal that between the two general armature planes.

My invention may be applied to an armature with any number of bobbins. I generally prefer, however, to employ at least sixteen bobbins on the armature. Such bobbins or coils may be arranged in two or more sets, and the bobbins or coils in the same armature plane may be wound over one another, or side by side, or in any other desired order or relation. The coils of one set may be connected to one commutator and the coils of the other set to another commutator or commutators, and the currents of the sets may be combined or united by means of proper connection between the commutator-brushes, either for quantity or for tension.

Figure 2:
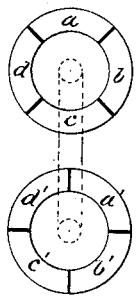
Figure 3:
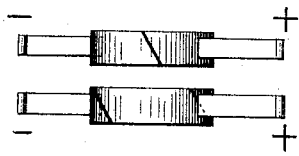
Figure 4:
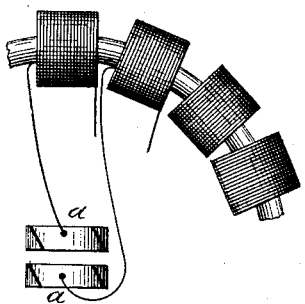
Figure 5:
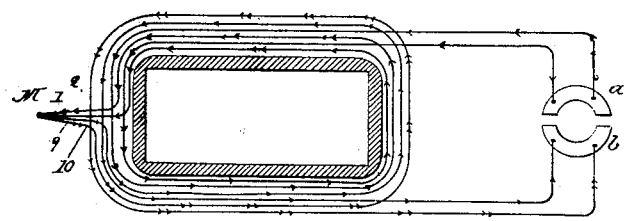

In the accompanying drawings, Figure 1 is a diagram illustrating my invention as applied to a ring-armature with sixteen coils. Fig. 2 shows the relative position of the two commutators when the sixteen coils are divided into two sets and each set is connected to a separate commutator. Fig. 3 shows in plan the double commutator and brushes. Fig. 4 shows a modified commutator and connections. Fig. 5 illustrates the manner of connecting the coils or bobbins of a cylindrical armature to one another and the commutator.

Referring to Fig. 1, A indicates the core or carrier of a ring-armature carrying sixteen coils, numbered from 1 to 16, inclusive, and indicated by the letter $b^2$. Coils 1 2 and 9 10, which are supposed to be in the same armature plane have their same or inner ends connected to diametrically-opposite plates of a commutator of any desired or usual construction, while their outer ends are connected together in a common joint, so that the current from coils 1 and 2 may combine in multiple arc with the multiple-arc currents from 9 and 10.

As is indicated, the two individual inner ends of 1 2 are carried to a commutator-segment, $a$, and the two individual inner ends of coils 9 10 are taken to the opposite commutator segment or plate $c$. Current is taken from said commutator-segments by the usual device of brushes bearing on the cylinder, and may be combined with the current from coils located in other armature planes and connected to other portions of the commutator by any suitable or desirable arrangement and combination of commutator segments and brushes.

N and S indicate the usual field-of-force poles between which the armature is supposed to revolve.

I prefer to combine the coils 1 2 and 9 10 with the coils 5 6 and 13 14, being in another armature plane, at right angles, for instance, to the plane in which coils 1 2 and 9 10 lie, by uniting the outer or inner ends of all the coils in a common joint, as indicated, the inner or outer ends of the coils 5 6 being at the same time connected to the commutator-segment $b$ in multiple arc and the inner or outer ends of 13 14 to the diametrically-opposite segment $d$.

It is to be understood that the plane of segments $b d$ is removed from that of $a c$ by an angle equal to that between the two sets of coils 1 2 9 10 and 5 6 13 14. The current may be taken from the combined sets by commutator-brushes applied in the usual way to connect each commutator-segment with the outer circuit, while the bobbins connected to such segment are active. Coils 3 4 7 8 11 12 15 16 may be connected to another commutator in a similar manner. Such commutator would bear the relation to the commutator $a b c d$ that is indicated in Fig. 2, where the second commutator is indicated by the letters $a' b' c' d'$. If a larger total number of coils were used, there might be a correspondingly-larger number of sets of coils and of commutator-cylinders.

In Fig. 3 the positive and negative commutator-brushes of the two cylinders are indicated by the signs + and —. The currents from the two cylinders may obviously be combined, either for tension by connecting one positive brush to one negative brush and the two remaining brushes to the circuit to be supplied, or for quantity by connecting the two positive brushes together and similarly the two negative.

I have described an arrangement of two armature-coils on one side of the armature (or four coils in all in the same armature plane) having their terminals each connected to the commutator, but do not limit myself to any particular number, as three, four, or more coils on each side and in the same general plane may be thus connected, making in each plane a set of six, eight, or more coils connected to one another and to the commutator, in accordance with my invention.

Instead of connecting the same ends of the coils to the same segment $a$, $b$, $c$, or $d$, I may connect them to separate segments $a$ in the same side of the commutator, as indicated in Fig. 4, and arrange them so that they will be connected with the commutator-brushes at the same time. The brushes bearing on the two plates may supply currents separately, or combined to separate working-circuits, or to a single working-circuit.

In Fig. 5 four coils of a drum or cylinder armature are indicated. These coils are numbered 1 2 9 10, to correspond with the similarly-numbered coils of Fig. 1, and are supposed to lie in the same general armature plane, and to be wound over one another, beside one another, or to be interwoven or arranged in any desired relation. The common joint is indicated at M, while the commutator-segments corresponding to those of Fig. 1 are shown at $a b$.

Other modifications in the general arrangements and combinations will readily occur to those skilled in the art.

What I claim as my invention is—

1. In a dynamo-electric machine, an armature two or more of whose coils in the same general armature plane have their same ends connected to the same portion of the commutator on one side thereof, while their opposite ends are connected to two or more coils in the same general plane similarly connected to the commutator on the opposite side thereof.

2. In a dynamo-electric machine, the combination of two or more armature-coils in the same general armature plane, and having their same ends connected to one side of the commutator, while their opposite ends are connected to two or more coils in the same plane, similarly connected to the opposite side of the commutator, and four or more similarly-arranged armature-coils in a plane at right angles to the first four, having their connected ends joined in a common joint with the connected ends of the first-named set of four, as and for the purpose described.

3. In a dynamo-electric machine, eight or more armature-coils arranged in two general planes at right angles to one another, and having their eight similar ends connected in a common joint, in combination with a commutator to which the opposite ends of the coils are connected in sets, the two or more ends of the coils in one plane that are positive at any given position of the armature being connected in multiple arc to one side of the commutator, while the two remaining ends of the coils in the same plane are connected in a similar manner to the opposite side of the commutator, as and for the purpose described.

Signed at New York, in the county of New York and State of New York, this 7th day of December, A. D. 1883.

BENJAMIN F. ORTON.

Witnesses:
  THOS. TOOMEY,
  GEO. C. COFFIN.